Nov. 22, 1932.  G. M. BARNES  1,888,420
VEHICLE
Filed Dec. 17, 1930
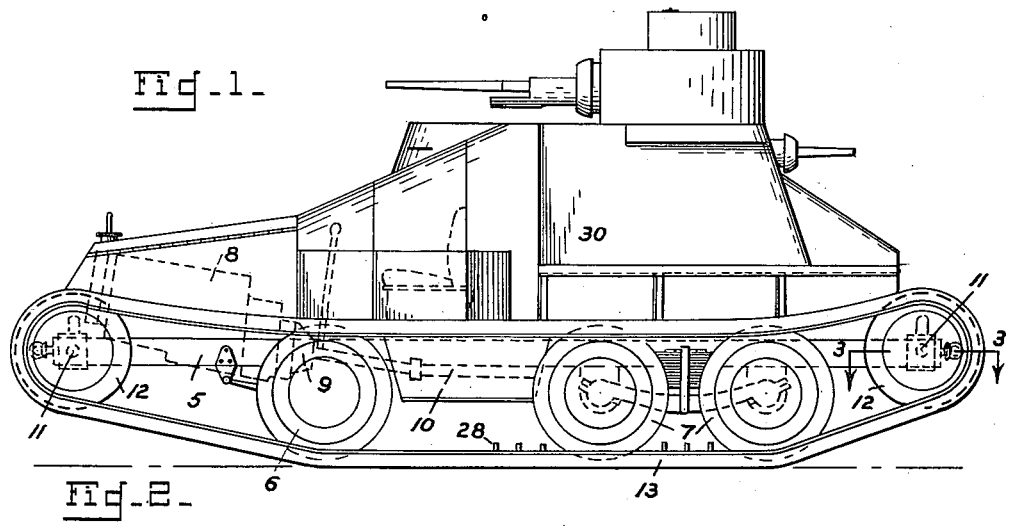
INVENTOR.
Gladeon M. Barnes
BY W. N. Roach
ATTORNEY Patented Nov. 22, 1932

1,888,420

UNITED STATES PATENT OFFICE

GLADEON M. BARNES, OF THE UNITED STATES ARMY, HASTINGS, MICHIGAN

VEHICLE

Application filed December 17, 1930. Serial No. 502,996.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a vehicle which may utilize wheel or belt traction and to a method of constructing such a vehicle from the chassis of a standard truck.

Wheeled vehicles and track-laying vehicles have distinctive types of suspension and power communication and control, the features of these units being particularly adapted to the mode of traction and the nature of the surface over which the vehicle is to travel.

In constructing a combination wheel and track-laying vehicle the general practice has been to retain the driving and running gear characteristic of the track-laying vehicle or to considerably modify the standard arrangement of these elements in a wheeled vehicle.

The combination wheel and track-laying vehicle has little or no application in the commercial field but is especially suited for military purposes. As a consequence any development of a vehicle of this type does not have the advantages and benefits resulting from the extended operation and the intense development of the commercial wheeled vehicle.

With a view to creating a potential reserve of military vehicles from the commercial vehicle and make available existing manufacturing establishments to insure immediate production in time of emergency it is proposed in the present invention to utilize the standard commercial chassis and with only a slight modification adapt it for both wheel and belt traction.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation of a vehicle embodying the features of construction forming the subject matter of the invention;

Fig. 2 is a diagrammatic view illustrating the system of brake controls;

Fig. 3 is a sectional view on the line 3—3 of Fig. 1;

Fig. 4 is a sectional view on the line 4—4 of Fig. 3;

Fig. 5 is a sectional view on the line 5—5 of Fig. 3.

Referring to the drawing by numerals of reference:

The vehicle comprises a commercial automobile truck chassis consisting of the frame 5, front steering wheel unit 6, double rear axle unit 7 in which both axles are driven, power plant 8, transmission mechanism 9, drive shaft 10. These units are assembled in their normal position and relation with the exception of the power plant which is inclined at an angle of about 5° and the front wheel unit 6 which is placed as close as possible to the rear unit 7 to more or less evenly divide the spacing of the three supporting units.

The frame 5 carries at each of its extremities an axle 11 on which are mounted wheels 12 that are normally clear of the ground for the purpose of inclining the ground flight of the encircling track 13. The extremities of the frame 5 are channeled as shown in Fig. 4 and a bracket 14 secured to the axle and embracing the channel plate 5 carries a nut 15 disposed within the channel. A screw shaft 16 engaging the nut is supported in an elbow bracket 17 fast on the frame and carries a bevel gear 18 meshing with a bevel gear 19 on a transversely disposed shaft 20 which is also supported by the elbow bracket. One of the shafts 16 is squared to receive a crank 21 whereby it is rotated. In this manner both the shafts 16 are turned at a uniform rate to advance or retract the axle 11 and vary the tension on the track.

Referring to Fig. 2, each wheel of the double rear axle unit 7 is equipped with a brake 22 and the brakes on each side of the vehicle have a control member 23 including a power operator 24 of commercial design.

The two control members 23 are each associated with one of a pair of pedals, the pedal 25 controlling the brakes on the right side of the vehicle and the pedal 26 controlling the brakes on the left side. The pedals are only slightly separated so that an operator may act on both of them with one foot or he may act on them independently of each other without interference.

When the vehicle is being operated with the track in place the front wheel unit is locked against turning in any convenient manner and steering is accomplished by applying the right or the left brakes to hold the corresponding track while the other track continues to be driven. When the track is removed the vehicle is steered by turning the front wheel unit 6 in the usual manner.

All of the wheels are of the dual type being provided with spaced rubber tires 27 as clearly shown in Fig. 2. The spacing accommodates the lugs 28 on the track. The wheels of the rear axle unit 7 are each provided with a sprocket wheel 29 positioned between the tires and arranged to engage the lugs and drive the track.

The body 30 is secured to the chassis in any approved manner and may be in any desired type, that shown representing the armored fighting compartment of a tank.

From the foregoing it will be seen that by substituting the track idlers 12 for the front steering wheels and displacing the front steering wheels to the rear, the track may be hung in the approved manner without increasing the length of the chassis.

I claim:

1. A combination wheel and track-laying vehicle including a frame, a twin axle unit including driving wheels on the rear of the frame, a front steering wheel unit set back from the front end of the frame to provide a sub-normal wheel base, a power plant carried by the frame in an inclined position in front of the front steering wheel unit, an axle carried at each extremity of the frame, means for moving each of said axles longitudinally of the frame, track idler wheels on said axles and normally spaced from the ground, and a track-driving sprocket carried by each of the driving wheels.

2. A combination wheel and track-laying vehicle including a frame, a twin axle unit including driving wheels on the rear of the frame, a front steering wheel unit set back from the front end of the frame to provide a sub-normal wheel base, a power plant carried by the frame in front of the front steering wheel unit, an axle carried at each extremity of the frame, means for moving each of said axles longitudinally of the frame, track idler wheels on said axles and normally spaced from the ground, and a track-driving sprocket carried by each of the driving wheels.

3. A combination wheel and track-laying vehicle including a frame, a twin axle unit including driving wheels on the rear of the frame, a front steering wheel unit set back from the front end of the frame to provide a sub-normal wheel base, a power plant carried by the frame in front of the front steering wheel unit, an axle carried at each extremity of the frame, track idler wheels on said axles and normally spaced from the ground, and a track-driving sprocket carried by each of the driving wheels.

GLADEON M. BARNES.